US012712771B2

(12) United States Patent
Hu et al.

(10) Patent No.: US 12,712,771 B2
(45) Date of Patent: Aug. 18, 2026

(54) PHYSICAL-LAYER PARAMETER DESIGNS ENABLING RU DUPLICATION AND TONE REPETITION FOR NEXT-GENERATION WLAN

(71) Applicant: MediaTek Inc., Hsinchu City (TW)

(72) Inventors: Shengquan Hu, San Jose, CA (US); Jianhan Liu, San Jose, CA (US); Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 303 days.

(21) Appl. No.: 18/367,435

(22) Filed: Sep. 12, 2023

(65) Prior Publication Data

US 2024/0089157 A1 Mar. 14, 2024

Related U.S. Application Data

(60) Provisional application No. 63/375,552, filed on Sep. 14, 2022.

(51) Int. Cl.
*H04L 27/26* (2006.01)
*H04L 1/00* (2006.01)
*H04W 84/12* (2009.01)

(52) U.S. Cl.
CPC ........ *H04L 27/2602* (2013.01); *H04L 1/0057* (2013.01); *H04L 1/0071* (2013.01); *H04W 84/12* (2013.01)

(58) Field of Classification Search
CPC ..... H04L 1/0057; H04L 1/0071; H04L 1/005; H04L 1/0061; H04L 1/0009;
(Continued)

(56) References Cited

U.S. PATENT DOCUMENTS

2016/0373133 A1* 12/2016 Karar ................. H03M 13/1111
2020/0305024 A1* 9/2020 Chen ................... H04W 28/065
(Continued)

FOREIGN PATENT DOCUMENTS

WO WO-2017027479 A1 * 2/2017 ............ H04W 72/23
WO WO 2022005193 A1 1/2022

OTHER PUBLICATIONS

European Patent Office, Extended European Search Report in European Patent Application No. 23197118.5, Feb. 12, 2024.
(Continued)

*Primary Examiner* — Khalid W Shaheed

(74) *Attorney, Agent, or Firm* — Andy M. Han; Han IP PLLC

(57) ABSTRACT

Techniques pertaining to physical-layer (PHY) parameter designs enabling resource unit (RU) duplication and tone repetition for next-generation wireless local area networks (WLANs) are described. An apparatus (e.g., station (STA)) generates an RU or multi-RU (MRU). The apparatus then performs a wireless communication with the RU or MRU. In generating the RU or MRU, the apparatus codes a spatial stream using a binary convolutional coding (BCC) interleaver or a low-density parity-check (LDPC) tone mapper. In performing the wireless communication, the apparatus performs the wireless communication with RU duplication or tone repetition in a frequency domain.

14 Claims, 18 Drawing Sheets

(58) Field of Classification Search
CPC ........... H03M 13/1102; H03M 13/116; H03M 13/255; H03M 13/6393
See application file for complete search history.

(56) References Cited

U.S. PATENT DOCUMENTS

| | | | | |
|---|---|---|---|---|
| 2021/0044398 | A1* | 2/2021 | Noh | H04L 1/0041 |
| 2022/0045889 | A1 | 2/2022 | Yu et al. | |
| 2023/0231670 | A1 | 7/2023 | Park et al. | |

OTHER PUBLICATIONS

"36. Extremely high throughput (EHT) PHY specification", IEEE Draft; TGBE_CL_36, IEEE-SA, Piscataway, NJ USA, vol. 802.11be drafts, No. D0.1, Sep. 30, 2020 (Sep. 30, 2020), pp. 1-205, XP068172120.

* cited by examiner

500

| Number of Tone Repetition | Parameter | RU or MRU size (tones) | | | | | |
|---|---|---|---|---|---|---|---|
| | | 26 | 52 | 52+26 | 106 | 106+26 | 242 |
| 2 | Nsd | 12 | 24 | 36 | 51 | 63 | 117 |
| | Ncol | 6 or 4 | 8 or12 | 9 or 18 or 12 | 17 | 21 or 9 | 13 or 39 |
| | Nrow | 2 or 3 | 3 or 2 | 4 or 2 or 3 | 3 | 3 or 7 | 9 or 3 |
| | Nrot | N/A | N/A | N/A | N/A | N/A | N/A |
| 3 | Nsd | 8 | 16 | 24 | 34 | 42 | 78 |
| | Ncol | 8 or 4 | 8 or 4 or 16 | 8 or 12 or 6 | 17 | 14 or 7 or 21 | 13 or 26 or 39 |
| | Nrow | 1 or 2 | 2 or 4 or 1 | 3 or 2 or 4 | 2 | 3 or 6 or 2 | 6 or 3 or 2 |
| | Nrot | N/A | N/A | N/A | N/A | N/A | N/A |
| 4 | Nsd | 6 | 12 | 18 | N/A | N/A | N/A |
| | Ncol | 3 | 6 or 12 or 4 | 6 or9 or 18 | | | |
| | Nrow | 2 | 2 or 1 or 3 | 3 or 2 or 1 | | | |
| | Nrot | N/A | N/A | N/A | | | |
| 6 | Nsd | 4 | 8 | 12 | 17 | 21 | 39 |
| | Ncol | 4 or 2 | 4 or 8 | 4 or 6 or 12 | 17 | 7 or 21 | 13 |
| | Nrow | 1 or 2 | 2 or 1 | 3 or 2 or 1 | 1 | 3 or 1 | 3 |
| | Nrot | N/A | N/A | N/A | N/A | N/A | N/A |
| 8 | Nsd | 3 | 6 | 9 | N/A | N/A | N/A |
| | Ncol | 3 | 6 or 3 | 9 or 3 | | | |
| | Nrow | 1 | 1 or 2 | 1 or 3 | | | |
| | Nrot | N/A | N/A | N/A | | | |
| 9 | Nsd | N/A | N/A | 8 | NA | 13 | 26 |
| | Ncol | | | 4 or 8 | | 13 | 13 |
| | Nrow | | | 2 or 1 | | 1 | 2 |
| | Nrot | | | N/A | | N/A | N/A |
| 12 | Nsd | 2 | 4 | 6 | N/A | N/A | N/A |
| | Ncol | 2 | 4 or 2 | 6 or 3 | | | |
| | Nrow | 1 | 1 or 2 | 1 or 2 | | | |
| | Nrot | N/A | N/A | N/A | | | |

| Number of Tone Repetition | Parameter | RU or MRU size (tones) | | | | | |
|---|---|---|---|---|---|---|---|
| | | 26 | 52 | 52+26 | 106 | 106+26 | 242 |
| 2 | Nsd | 12 | 24 | 36 | 51 | 63 | 117 |
| | Ncol | 6 or 4 | 8 or12 | 9 or 18 or 12 | 17 | 21 or 9 | 13 or 39 |
| | Nrow | 2 or 3 | 3 or 2 | 4 or 2 or 3 | 3 | 3 or 7 | 9 or 3 |
| | Nrot | N/A | N/A | N/A | N/A | N/A | N/A |
| 3 | Nsd | 8 | 16 | 24 | 34 | 42 | 78 |
| | Ncol | 8 or 4 | 8 or 4 or 16 | 8 or 12 or 6 | 17 | 14 or 7 or 21 | 13 or 26 or 39 |
| | Nrow | 1 or 2 | 2 or 4 or 1 | 3 or 2 or 4 | 2 | 3 or 6 or 2 | 6 or 3 or 2 |
| | Nrot | N/A | N/A | N/A | N/A | N/A | N/A |
| 4 | Nsd | 6 | 12 | 18 | 25 | 31 | 58 |
| | Ncol | 3 | 6 or 12 or 4 | 6 or9 or 18 | 5 | 31 | 29 |
| | Nrow | 2 | 2 or 1 or 3 | 3 or 2 or 1 | 5 | 1 | 2 |
| | Nrot | N/A | N/A | N/A | N/A | N/A | N/A |
| 6 | Nsd | 4 | 8 | 12 | 17 | 21 | 39 |
| | Ncol | 4 or 2 | 4 or 8 | 4 or 6 or 12 | 17 | 7 or 21 | 13 |
| | Nrow | 1 or 2 | 2 or 1 | 3 or 2 or 1 | 1 | 3 or 1 | 3 |
| | Nrot | N/A | N/A | N/A | N/A | N/A | N/A |
| 8 | Nsd | 3 | 6 | 9 | 12 | 15 | 29 |
| | Ncol | 3 | 6 or 3 | 9 or 3 | 6 or 4 or 12 | 5 or 15 | 29 |
| | Nrow | 1 | 1 or 2 | 1 or 3 | 2 or 3 or 1 | 3 or 1 | 1 |
| | Nrot | N/A | N/A | N/A | N/A | N/A | N/A |
| 9 | Nsd | 2 | 5 | 8 | 11 | 13 | 26 |
| | Ncol | 2 | 5 | 4 or 8 | 11 | 13 | 13 |
| | Nrow | 1 | 1 | 2 or 1 | 1 | 1 | 2 |
| | Nrot | N/A | N/A | N/A | N/A | N/A | N/A |
| 12 | Nsd | 2 | 4 | 6 | 8 | 15 | 19 |
| | Ncol | 2 | 4 or 2 | 6 or 3 | 4 or 8 | 5 or 15 | 19 |
| | Nrow | 1 | 1 or 2 | 1 or 2 | 2 or 1 | 3 or 1 | 1 |
| | Nrot | N/A | N/A | N/A | N/A | N/A | N/A |

| Number of Tone Repetition | Parameter | RU or MRU size (tones) | | | | | |
|---|---|---|---|---|---|---|---|
| | | 26 | 52 | 52+26 | 106 | 106+26 | 242 |
| 2 | Nsd | 12 | 24 | 36 | 51 | 63 | 117 |
| | Ncol | 6 or 4 | 8 or 12 | 9 or 18 or 12 | 17 | 21 or 9 | 13 or 39 |
| | Nrow | {2 or 3}xNbpscs | {3 or 2}xNbpscs | {4 or 2 or 3}xNbpscs | 3xNbpscs | {3 or 7}xNbpscs | {9 or 3}xNbpscs |
| | Nrot | 2 | 11 | 11 | 29 | 29 | 58 |
| 3 | Nsd | 8 | 16 | 24 | 34 | 42 | 78 |
| | Ncol | 8 or 4 | 8 or 4 or 16 | 8 or 12 or 6 | 17 | 14 or 7 or 21 | 13 or 26 or 39 |
| | Nrow | {1 or 2}xNbpscs | {2 or 4 or 1}xNbpscs | {3 or 2 or 4}xNbpscs | 2 | {3 or 6 or 2}xNbpscs | {6 or 3 or 2}xNbpscs |
| | Nrot | 2 | 11 | 11 | 11 | 11 | 29 |
| 4 | Nsd | 6 | 12 | 18 | 25 | 31 | 58 |
| | Ncol | 3 | 6 or 12 or 4 | 6 or 9 or 18 | 5 | 31 | 29 |
| | Nrow | 2xNbpscs | {2 or 1 or 3}xNbpscs | {3 or 2 or 1}xNbpscs | 5xNbpscs | 1xNbpscs | 2xNbpscs |
| | Nrot | 2 | 2 | 2 | 2 | 2 | 11 |
| 6 | Nsd | 4 | 8 | 12 | 17 | 21 | 39 |
| | Ncol | 4 or 2 | 4 or 8 | 4 or 6 or 12 | 17 | 7 or 21 | 13 |
| | Nrow | {1 or 2}xNbpscs | {2 or 1}xNbpscs | {3 or 2 or 1}xNbpscs | 1xNbpscs | {3 or 1}xNbpscs | 3xNbpscs |
| | Nrot | 2 | 2 | 2 | 2 | 2 | 11 |
| 8 | Nsd | 3 | 6 | 9 | 12 | 15 | 29 |
| | Ncol | 3 | 6 or 3 | 9 or 3 | 6 or 4 or 12 | 5 or 15 | 29 |
| | Nrow | 1xNbpscs | {1 or 2}xNbpscs | {1 or 3}xNbpscs | {2 or 3 or 1}xNbpscs | {3 or 1}xNbpscs | 1xNbpscs |
| | Nrot | 2 | 2 | 2 | 2 | 2 | 2 |
| 9 | Nsd | 2 | 5 | 8 | 11 | 13 | 26 |
| | Ncol | 2 | 5 | 4 or 8 | 11 | 13 | 13 |
| | Nrow | 1xNbpscs | 1xNbpscs | {2 or 1}xNbpscs | 1xNbpscs | 1xNbpscs | 2xNbpscs |
| | Nrot | 2 | 2 | 2 | 2 | 2 | 2 |
| 12 | Nsd | 2 | 4 | 6 | 8 | 15 | 19 |
| | Ncol | 2 | 4 or 2 | 6 or 3 | 4 or 8 | 5 or 15 | 19 |
| | Nrow | 1xNbpscs | {1 or 2}xNbpscs | {1 or 2}xNbpscs | {2 or 1}xNbpscs | {3 or 1}xNbpscs | 1xNbpscs |
| | Nrot | 2 | 2 | 2 | 2 | 2 | 2 |

| Number of Tone Repetition | RU or MRU size (tones) | | | | | |
|---|---|---|---|---|---|---|
| | 26 | 52 | 52+26 | 106 | 106+26 | 242 |
| 2 | 1 or 2 | 1 or 2 | 3 or 2 | 3 | 3 or 7 | 9 or 3 |
| 3 | 1 | 1 | 1 or 2 or 3 | 2 | 3 or 2 | 3 or 2 or 6 |
| 4 | 1 | 1 | 1 | N/A | N/A | N/A |
| 6 | 1 | 1 | 1 | 1 | 1 or 3 | 3 or 1 |
| 8 | 1 | 1 | 1 | N/A | N/A | N/A |
| 9 | N/A | N/A | 1 | N/A | 1 | 1 or 2 |
| 12 | 1 | 1 | 1 | N/A | N/A | N/A |

| Number of Tone Repetition | RU or MRU size (tones) | | | | | |
|---|---|---|---|---|---|---|
| | 26 | 52 | 52+26 | 106 | 106+26 | 242 |
| 2 | 1 or 2 | 1 or 2 | 3 or 2 | 3 | 3 or 7 | 9 or 3 |
| 3 | 1 | 1 | 1 or 2 or 3 | 2 | 3 or 2 | 3 or 2 or 6 |
| 4 | 1 | 1 | 1 | 5 | 1 | 2 |
| 6 | 1 | 1 | 1 | 1 | 1 or 3 | 3 or 1 |
| 8 | 1 | 1 | 1 | 1 or 2 or 3 | 1 or 3 | 1 |
| 9 | 1 | 1 | 1 | 1 | 1 | 1 or 2 |
| 12 | 1 | 1 | 1 | 1 | 1 or 2 | 1 |

| Tone Repetition | Number of Leftover Tones | | | | | |
|---|---|---|---|---|---|---|
| | 26 | 52 | 52+26 | 106 | 106+26 | 242 |
| 2 | 0 | 0 | 0 | 0 | 0 | 0 |
| 3 | 0 | 0 | 0 | 0 | 0 | 0 |
| 4 | 0 | 0 | 0 | 2 | 2 | 2 |
| 6 | 0 | 0 | 0 | 0 | 0 | 0 |
| 8 | 0 | 0 | 0 | 6 | 6 | 2 |
| 9 | 6 | 3 | 0 | 3 | 0 | 0 |
| 12 | 0 | 0 | 0 | 6 | 6 | 6 |

| RU or MRU Size (tones) | Nsd,short | | | | | | |
|---|---|---|---|---|---|---|---|
| | 2x repetition | 3x repetition | 4x repetition | 6x repetition | 8x repetition | 9x repetition | 12x repetition |
| 26 | 4 | 2 | 2 | 2 | 2 | 2 | 2 |
| 52 | 6 | 4 | 4 | 2 | 2 | 2 | 2 |
| 52+26 | 10 or 8 | 6 | 4 | 4 | 2 | 2 | 2 |
| 106 | 12 | 8 | 6 | 4 | 4 | 2 | 2 |
| 106+26 | 16 or 14 | 10 | 8 | 6 | 4 | 4 | 2 |
| 242 | 30 | 20 | 14 | 10 | 8 | 6 | 2 |

| RU or MRU Size (tones) | Nsd,short | | | | | | |
|---|---|---|---|---|---|---|---|
| | 2x repetition | 3x repetition | 4x repetition | 6x repetition | 8x repetition | 9x repetition | 12x repetition |
| 26 | 4 | 4 | 4 | 4 | 4 | 4 | 4 |
| 52 | 8 | 4 | 4 | 4 | 4 | 4 | 4 |
| 52+26 | 8 | 8 | 4 | 4 | 4 | 4 | 4 |
| 106 | 12 | 8 | 8 | 4 | 4 | 4 | 4 |
| 106+26 | 16 | 12 | 8 | 8 | 4 | 4 | 4 |
| 242 | 28 | 20 | 16 | 8 | 8 | 8 | 4 |

| | Effective Coding Rate with Tone Repetition | | |
|---|---|---|---|
| Tone Repetition | Base Code Rate R=1/2 | Base Code Rate R=1/3 | Base Code Rate R=1/4 |
| 2 | 1/4 | 1/6 | 1/8 |
| 3 | 1/6 | 1/9 | 1/12 |
| 4 | 1/8 | 1/12 | 1/16 |
| 6 | 1/12 | 1/18 | 1/24 |
| 8 | 1/16 | 1/24 | 1/32 |
| 9 | 1/18 | 1/27 | 1/36 |
| 12 | 1/24 | 1/36 | 1/48 |
| 16 | 1/32 | 1/48 | 1/64 |

Figure 14:
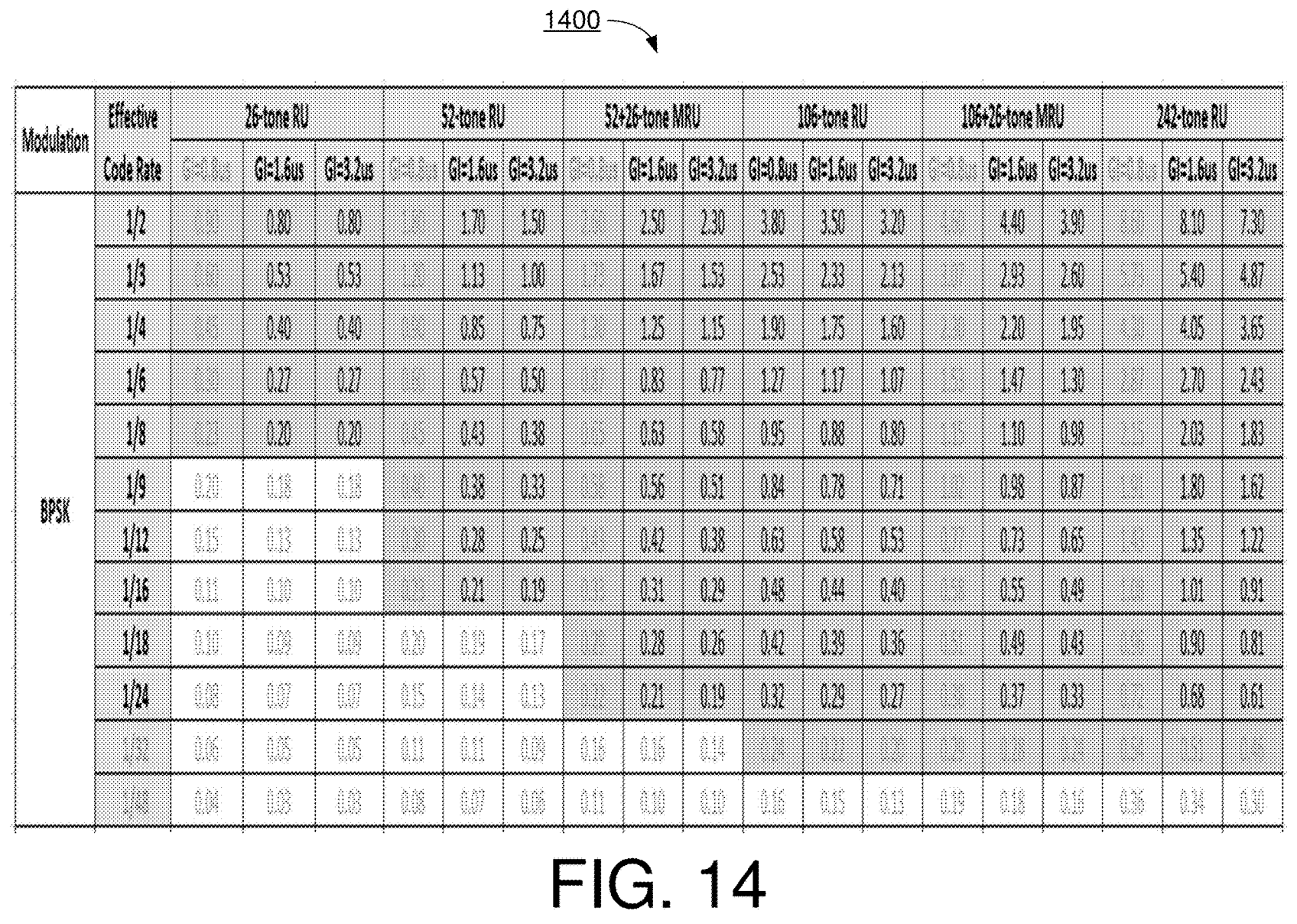

| Modulation | Effective Code Rate | 26-tone RU | | | 52-tone RU | | | 52+26-tone MRU | | | 106-tone RU | | | 106+26-tone MRU | | | 242-tone RU | | |
|---|---|---|---|---|---|---|---|---|---|---|---|---|---|---|---|---|---|---|---|
| | | GI=0.8us | GI=1.6us | GI=3.2us | GI=0.8us | GI=1.6us | GI=3.2us | GI=0.8us | GI=1.6us | GI=3.2us | GI=0.8us | GI=1.6us | GI=3.2us | GI=0.8us | GI=1.6us | GI=3.2us | GI=0.8us | GI=1.6us | GI=3.2us |
| BPSK | 1/2 | | 0.80 | 0.80 | | 1.70 | 1.50 | | 2.50 | 2.30 | 3.80 | 3.50 | 3.20 | | 4.40 | 3.90 | | 8.10 | 7.30 |
| | 1/3 | | 0.53 | 0.53 | | 1.13 | 1.00 | | 1.67 | 1.53 | 2.53 | 2.33 | 2.13 | | 2.93 | 2.60 | | 5.40 | 4.87 |
| | 1/4 | | 0.40 | 0.40 | | 0.85 | 0.75 | | 1.25 | 1.15 | 1.90 | 1.75 | 1.60 | | 2.20 | 1.95 | | 4.05 | 3.65 |
| | 1/6 | | 0.27 | 0.27 | | 0.57 | 0.50 | | 0.83 | 0.77 | 1.27 | 1.17 | 1.07 | | 1.47 | 1.30 | | 2.70 | 2.43 |
| | 1/8 | | 0.20 | 0.20 | | 0.43 | 0.38 | | 0.63 | 0.58 | 0.95 | 0.88 | 0.80 | | 1.10 | 0.98 | | 2.03 | 1.83 |
| | 1/9 | 0.20 | 0.18 | 0.18 | | 0.38 | 0.33 | | 0.56 | 0.51 | 0.84 | 0.78 | 0.71 | | 0.98 | 0.87 | | 1.80 | 1.62 |
| | 1/12 | 0.15 | 0.13 | 0.13 | | 0.28 | 0.25 | | 0.42 | 0.38 | 0.63 | 0.58 | 0.53 | | 0.73 | 0.65 | | 1.35 | 1.22 |
| | 1/16 | 0.11 | 0.10 | 0.10 | | 0.21 | 0.19 | | 0.31 | 0.29 | 0.48 | 0.44 | 0.40 | | 0.55 | 0.49 | | 1.01 | 0.91 |
| | 1/18 | 0.10 | 0.09 | 0.09 | 0.20 | 0.19 | 0.17 | | 0.28 | 0.26 | 0.42 | 0.39 | 0.36 | | 0.49 | 0.43 | | 0.90 | 0.81 |
| | 1/24 | 0.08 | 0.07 | 0.07 | 0.15 | 0.14 | 0.13 | | 0.21 | 0.19 | 0.32 | 0.29 | 0.27 | | 0.37 | 0.33 | | 0.68 | 0.61 |
| | 1/32 | 0.06 | 0.05 | 0.05 | 0.11 | 0.11 | 0.09 | 0.16 | 0.16 | 0.14 | | | | | | | | | |
| | 1/48 | 0.04 | 0.03 | 0.03 | 0.08 | 0.07 | 0.06 | 0.11 | 0.10 | 0.10 | 0.16 | 0.15 | 0.13 | 0.19 | 0.18 | 0.16 | 0.36 | 0.34 | 0.30 |

| RU Type | Number of Repetition | bR | eR | Nbpscs | Nsd | Ncbps | Ndbps |
|---|---|---|---|---|---|---|---|
| 26 | 2 | 1/2 | 1/4 | 1 | 12 | 24 | 6 |
| | 3 | | 1/6 | 1 | 8 | | 4 |
| | 4 | | 1/8 | 1 | 6 | | 3 |
| | 6 | | 1/12 | 1 | 4 | | 2 |
| | 8 | | 1/16 | 1 | 3 | | 1 |
| | 9 | | 1/18 | 1 | 2 | | 1 |
| | 12 | | 1/24 | 1 | 2 | | 1 |
| | 16 | | 1/32 | NA | NA | | NA |

| RU Type | Number of Repetition | bR | eR | Nbpscs | Nsd | Ncbps | Ndbps |
|---|---|---|---|---|---|---|---|
| 52 | 2 | 1/2 | 1/4 | 1 | 24 | 48 | 12 |
| | 3 | | 1/6 | 1 | 16 | | 8 |
| | 4 | | 1/8 | 1 | 12 | | 6 |
| | 6 | | 1/12 | 1 | 8 | | 4 |
| | 8 | | 1/16 | 1 | 6 | | 3 |
| | 9 | | 1/18 | 1 | 5 | | 2 |
| | 12 | | 1/24 | 1 | 4 | | 2 |
| | 16 | | 1/32 | 1 | 3 | | 1 |

| RU Type | Number of Repetition | bR | eR | Nbpscs | Nsd | Ncbps | Ndbps |
|---|---|---|---|---|---|---|---|
| 106 | 2 | 1/2 | 1/4 | 1 | 51 | 102 | 25 |
| | 3 | | 1/6 | 1 | 34 | | 17 |
| | 4 | | 1/8 | 1 | 25 | | 12 |
| | 6 | | 1/12 | 1 | 17 | | 8 |
| | 8 | | 1/16 | 1 | 12 | | 6 |
| | 9 | | 1/18 | 1 | 11 | | 5 |
| | 12 | | 1/24 | 1 | 8 | | 4 |
| | 16 | | 1/32 | 1 | 6 | | 3 |

| RU Type | Number of Repetition | bR | eR | Nbpscs | Nsd | Ncbps | Ndbps |
|---|---|---|---|---|---|---|---|
| 242 | 2 | 1/2 | 1/4 | 1 | 117 | 234 | 58 |
| | 3 | | 1/6 | 1 | 78 | | 39 |
| | 4 | | 1/8 | 1 | 58 | | 29 |
| | 6 | | 1/12 | 1 | 39 | | 19 |
| | 8 | | 1/16 | 1 | 29 | | 14 |
| | 9 | | 1/18 | 1 | 26 | | 13 |
| | 12 | | 1/24 | 1 | 19 | | 9 |
| | 16 | | 1/32 | 1 | 14 | | 7 |

GENERATE, BY A PROCESSOR OF AN APPARATUS, A RESOURCE UNIT (RU) OR MULTI-RU (MRU) BY CODING A SPATIAL STREAM USING A BINARY CONVOLUTIONAL CODING (BCC) INTERLEAVER OR A LOW-DENSITY PARITY-CHECK (LDPC) TONE MAPPER

1810

PERFORM, BY THE PROCESSOR, A WIRELESS COMMUNICATION WITH THE RU OR MRU AND WITH RU DUPLICATION OR TONE REPETITION IN A FREQUENCY FOMAIN

1820

PHYSICAL-LAYER PARAMETER DESIGNS ENABLING RU DUPLICATION AND TONE REPETITION FOR NEXT-GENERATION WLAN

CROSS REFERENCE TO RELATED PATENT APPLICATION

The present disclosure is part of a non-provisional patent application claiming the priority benefit of U.S. Provisional Patent Application Nos. 63/375,552, filed 14 Sep. 2022, the content of which herein being incorporated by reference in its entirety.

TECHNICAL FIELD

The present disclosure is generally related to wireless communications and, more particularly, to physical-layer (PHY) parameter designs enabling resource unit (RU) duplication and tone repetition for next-generation wireless local area networks (WLANs).

BACKGROUND

Unless otherwise indicated herein, approaches described in this section are not prior art to the claims listed below and are not admitted as prior art by inclusion in this section.

In wireless communications such as Wi-Fi (or WiFi) in accordance with the Institute of Electrical and Electronics Engineers (IEEE) 802.11 standards, RU duplication and tone repetition have been proposed to achieve low coding rate and reliable transmission for enhanced long range (ELR) applications. Furthermore, peak-to-average power ratio (PAPR) reduction techniques are studied and proposed. Nevertheless, at present time, details on designs related to PHY parameters for RU duplication and tone repetition such as, for example, a number of data subcarriers ($N_{sd}$), a smaller number of data subcarriers in a short symbol segment with ($N_{sd,\ short}$) for pre-forward error correction (pre-FEC) padding and post-FEC padding, a number of rows ($N_{row}$), a number of columns ($N_{col}$) and a number of rotations ($N_{rot}$) for binary convolutional coding (BCC) interleaver, tone mapping distance ($D_{tm}$) for low-density parity-check (LDPC) tone mapper, number of coded bits per symbol ($N_{cbps}$), number of data bits per symbol ($N_{dbps}$) and so on, have yet to be defined. Therefore, there is a need for a solution of PHY parameter designs enabling RU duplication and tone repetition for next-generation WLANs.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to PHY parameter designs enabling RU duplication and tone repetition for next-generation WLANs.

In one aspect, a method may involve generating a RU or multi-RU (MRU). The method may also involve performing a wireless communication with the RU or MRU. In generating the RU or MRU, the method involves coding a spatial stream using a binary convolutional coding (BCC) interleaver or a low-density parity-check (LDPC) tone mapper. In performing the wireless communication, the method involves performing the wireless communication with RU duplication or tone repetition in a frequency domain.

In another aspect, an apparatus may include a transceiver configured to communicate wirelessly and a processor coupled to the transceiver. The processor may generate a RU or MRU. The processor may also perform a wireless communication with the RU or MRU. In generating the RU or MRU, the processor codes a spatial stream using a BCC interleaver or an LDPC tone mapper. In performing the wireless communication, the processor performs the wireless communication with RU duplication or tone repetition in a frequency domain.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, Zig Bee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 5 is a diagram of an example design under a proposed scheme in accordance with the present disclosure.

FIG. 6 is a diagram of an example design under a proposed scheme in accordance with the present disclosure.

FIG. 7 is a diagram of an example design under a proposed scheme in accordance with the present disclosure.

FIG. 8 is a diagram of an example design under a proposed scheme in accordance with the present disclosure.

FIG. 9 is a diagram of an example design under a proposed scheme in accordance with the present disclosure.

FIG. 10 is a diagram of an example design under a proposed scheme in accordance with the present disclosure.

FIG. 11 is a diagram of an example design under a proposed scheme in accordance with the present disclosure.

FIG. 12 is a diagram of an example design under a proposed scheme in accordance with the present disclosure.

FIG. 13 is a diagram of an example design under a proposed scheme in accordance with the present disclosure.

FIG. 14 is a diagram of an example design under a proposed scheme in accordance with the present disclosure.

FIG. 15 is a diagram of an example design under a proposed scheme in accordance with the present disclosure.

FIG. 16 is a diagram of an example design under a proposed scheme in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

OVERVIEW

Implementations in accordance with the present disclosure relate to various techniques, methods, schemes and/or solutions pertaining to PHY parameter designs enabling RU duplication and tone repetition for next-generation WLANs. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M, a bandwidth of 480 MHz may be interchangeably denoted as BW480 or BW480M, a bandwidth of 500 MHz may be interchangeably denoted as BW500 or BW500M, a bandwidth of 520 MHz may be interchangeably denoted as BW520 or BW520M, a bandwidth of 540 MHz may be interchangeably denoted as BW540 or BW540M, a bandwidth of 640 MHz may be interchangeably denoted as BW640 or BW640M.

Figure 1:
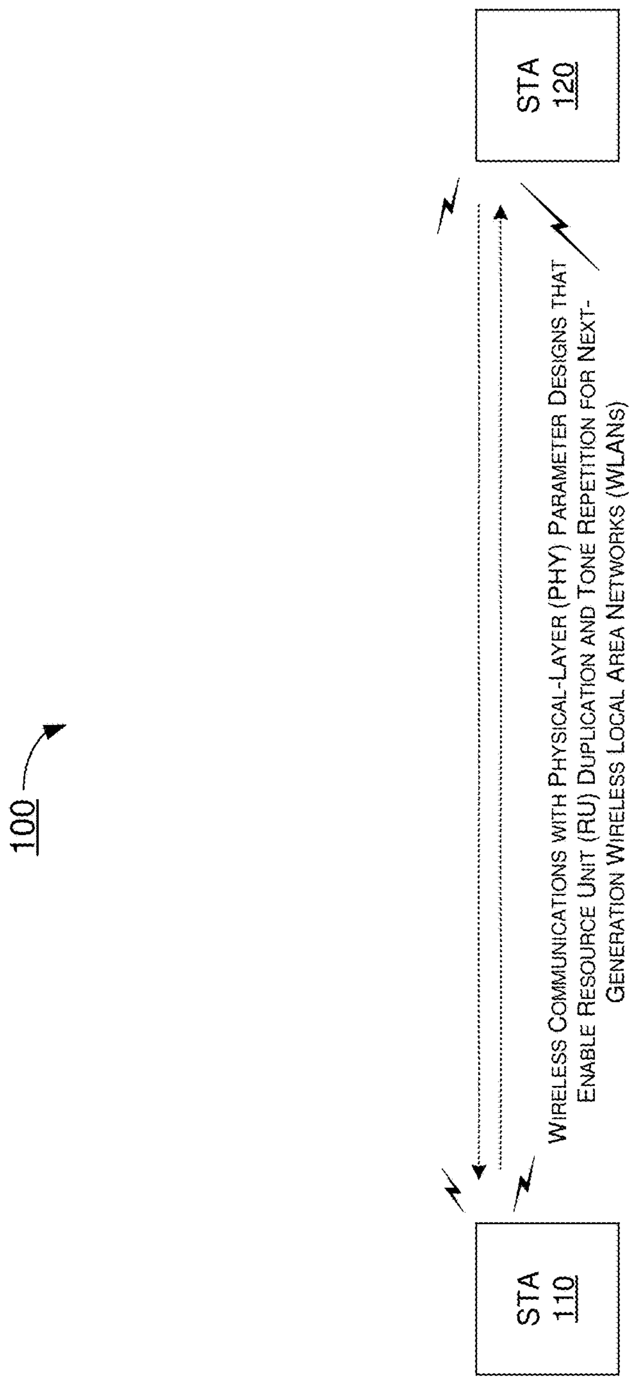
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2-FIG. 18 illustrate examples of implementation of various proposed schemes in network environment 100 in accordance with the present disclosure. The following description of various proposed schemes is provided with reference to FIG. 1-FIG. 18.

Referring to FIG. 1, network environment 100 may involve at least a station (STA) 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other by utilizing the PHY parameter designs enabling RU duplication and tone repetition for next-generation WLANs in accordance with various proposed schemes described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Figure 2:
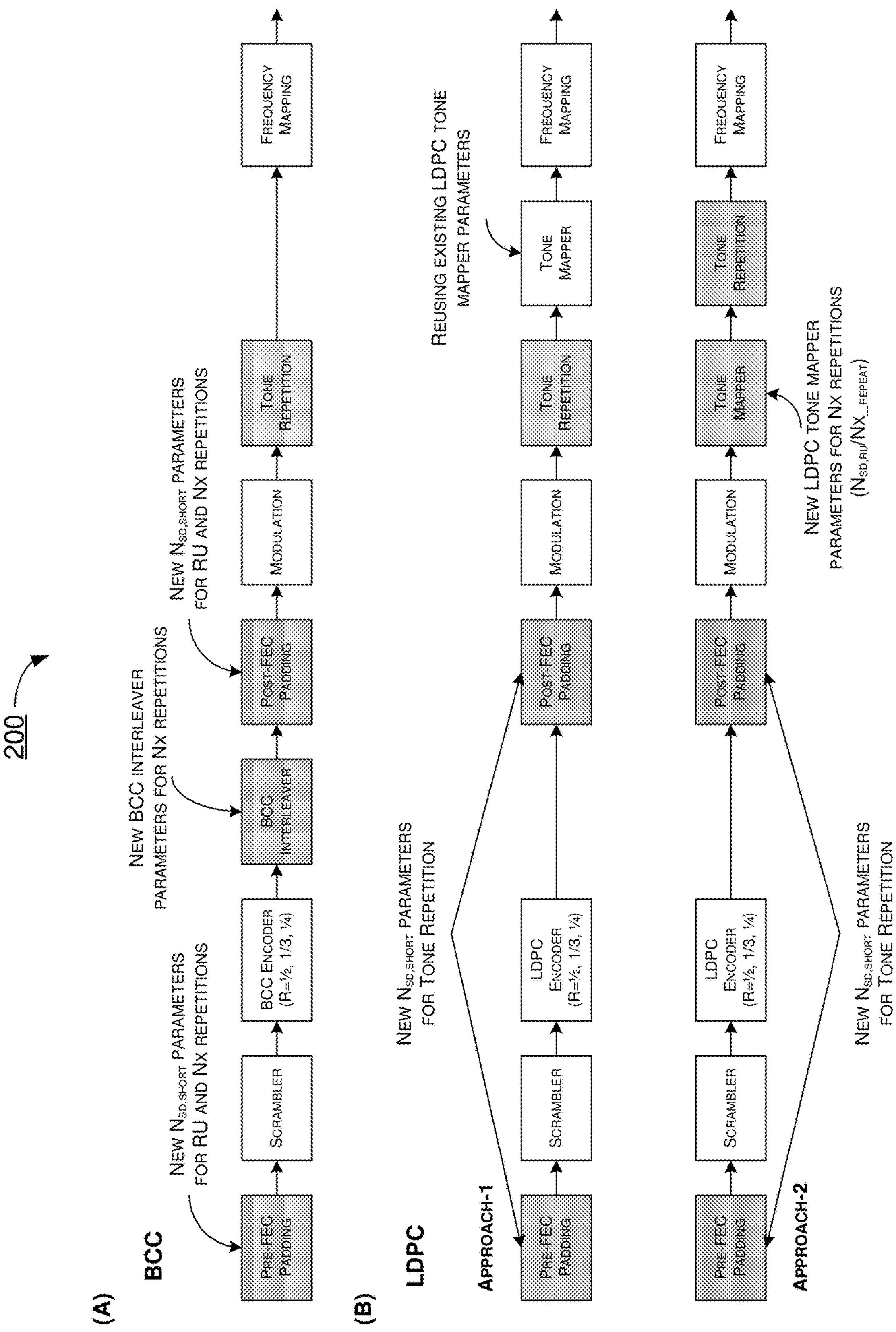
FIG. 2 is a diagram of an example design under a proposed scheme in accordance with the present disclosure.

FIG. 2 illustrates an example design 200 under a proposed scheme in accordance with the present disclosure. Design 200 pertains to a chain of functional blocks for transmission with tone repetition under the proposed scheme. Part (A) of FIG. 2 shows a chain of functional blocks for transmission with BCC coding and tone repetition under the proposed scheme. Part (B) of FIG. 2 shows a chain of functional blocks for transmission with LDPC coding and tone repetition under the proposed scheme. Some of the functional blocks, such as those shaded blocks shown in FIG. 2, may have respective PHY parameters changed or otherwise redefined to enable RU duplication and tone repetition for next-generation WLANs.

With respect to transmission with LDPC coding, there may be two approaches for LDPC tone mapper for tone repetition under the proposed scheme. Referring to FIG. 2, a first approach (Approach-1) may involve performing tone repetition first before applying LDPC tone mapping on RUs. A second approach (Approach-2) may involve applying LDPC tone mapping over $N_{sd,ru}/N_{x\_repeat}$ tones first before performing tone repetition on the "interleaved tones," as shown in FIG. 2. In terms of packet error rate (PER), the second approach may be preferred since it tends to achieve better PER performances.

Figure 3:
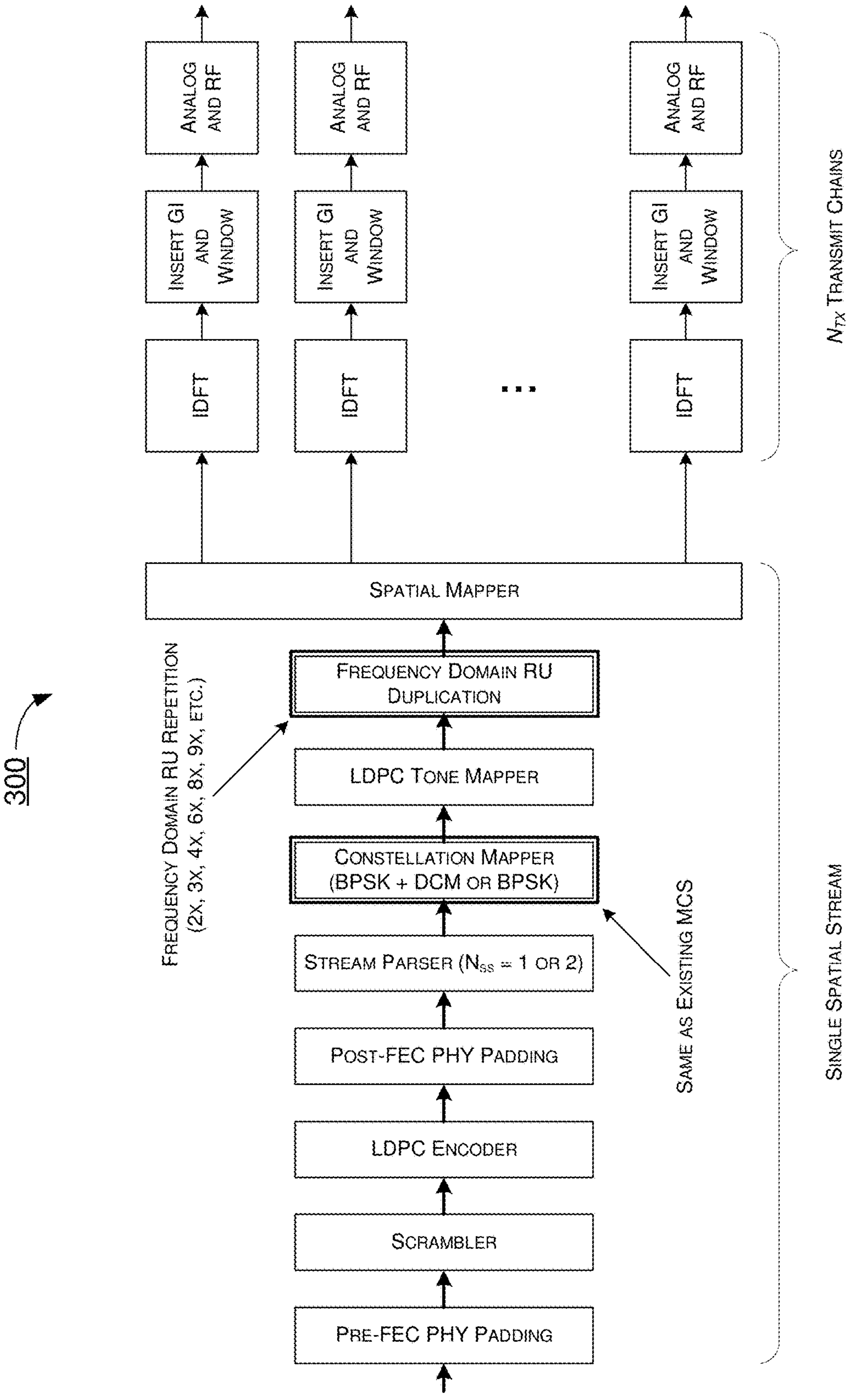
FIG. 3 is a diagram of an example design under a proposed scheme in accordance with the present disclosure.

FIG. 3 illustrates an example design 300 under a proposed scheme in accordance with the present disclosure. Design 300 pertains to a chain of functional blocks for transmission with LDPC coding and RU duplication under the proposed scheme. In design 300, a stream of bits of data and/or information may be coded or otherwise processed as a single spatial stream through a number of functional blocks, including: pre-forward error correction (pre-FEC) PHY padding, scrambler, LDPC encoder, post-FEC PHY padding, stream parser (with the number of spatial stream, $N_{ss}$, being 1), constellation mapper, LDPC tone mapper, frequency-domain (FD) RU duplication, and spatial mapper. The FD RU duplication functional block may perform FD repetition of two times (2×), three times (3×), four times (4×), six times (6×), eight times (8×), nine times (9×), twelve times (12×), sixteen times (16×) and so on. The spatial mapper functional block may output multiple streams of tones to multiple transmit chains (with a quantity of $N_{TX}$) for transmission. Each of the Nix transmit chains may include a number of functional blocks, including: inverse discrete Fourier transformation (IDFT), insertion of guard interval (GI) and window, and analog and radio frequency (RF). Under the proposed scheme, the same processing as corresponding duplicated RU (e.g., RU26, RU52 and so on) may be utilized in the functional blocks of Pre-FEC PHY padding, scrambler, LDPC encoder and post-FEC PHY padding. Moreover, existing LDPC tone mapper parameters may be reused in the LDPC tone mapper of design 300 for corresponding duplicated RU(s) (e.g., RU26, RU52 and so on). As for the constellation mapper functional block, an existing modulation and coding scheme (MCS), such as MCS15 (with binary phase-shift keying (BPSK)+dual-carrier modulation (DCM)) or another MCS (e.g., MCSO with BPSK), may be utilized.

Figure 4:
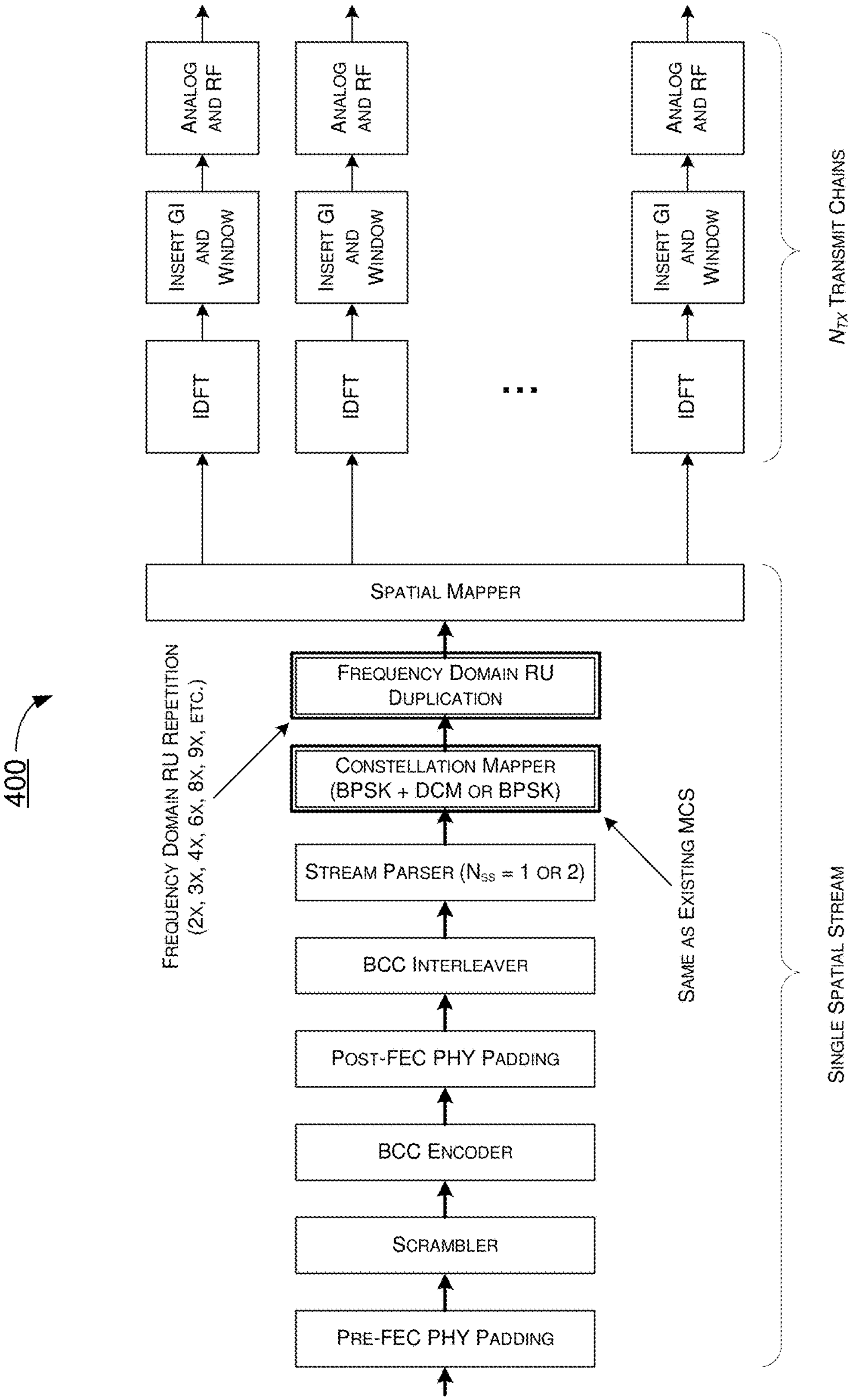
FIG. 4 is a diagram of an example design under a proposed scheme in accordance with the present disclosure.

FIG. 4 illustrates an example design 400 under a proposed scheme in accordance with the present disclosure. Design 400 pertains to a chain of functional blocks for transmission with BCC coding and RU duplication under the proposed scheme. In design 400, a stream of bits of data and/or information may be coded or otherwise processed as a single spatial stream through a number of functional blocks, including: pre-FEC PHY padding, scrambler, BCC encoder, post-FEC PHY padding, BCC interleaver, stream parser (with the number of spatial stream, $N_{ss}$, being 1), constellation mapper, FD RU duplication, and spatial mapper. The FD RU duplication functional block may perform FD RU repetition of 2×, 3×, 4×, 6× 8×, 9×, 12×, 16× and so on. The spatial mapper functional block may output multiple streams of tones to multiple transmit chains (with a quantity of $N_{TX}$) for transmission. Each of the Nix transmit chains may include a number of functional blocks, including: IDFT, insertion of GI and window, and analog and RF. Under the proposed scheme, the same processing as corresponding duplicated RU (e.g., RU26, RU52 and so on) may be utilized in the functional blocks of Pre-FEC PHY padding, scrambler, LDPC encoder and post-FEC PHY padding. Moreover, existing BCC interleaver parameters may be reused in the BCC interleaver of design 400 for corresponding duplicated RU(s) (e.g., RU26, RU52 and so on). As for the constellation mapper functional block, an existing MCS, such as MCS15 (with BPSK+DCM) or another MCS (e.g., MCSO with BPSK), may be utilized.

FIG. 5 illustrates an example design 500 under a proposed scheme in accordance with the present disclosure. Design 500 pertains to BCC interleaver parameters under the proposed scheme for tone repetition without leftover tones. The table in FIG. 5 shows the PHY parameters $N_{sd}$, $N_{col}$, $N_{row}$ and $N_{rot}$ with the assumption of BPSK modulation and $N_{ss}$=1 for various numbers of tone repetition and different sizes of RU and MRU (listed in terms of number of tones).

FIG. 6 illustrates an example design 600 under a proposed scheme in accordance with the present disclosure. Design 600 pertains to BCC interleaver parameters under the proposed scheme for tone repetition with leftover tones. The table in FIG. 6 shows the PHY parameters $N_{sd}$, $N_{col}$, $N_{row}$ and $N_{rot}$ with the assumption of BPSK modulation and $N_{ss}$=1 for various numbers of tone repetition and different sizes of RU and MRU (listed in terms of number of tones). Compared to design 500, design 600 additionally provides values (in shaded boxes) for $N_{sd}$, $N_{col}$ and $N_{row}$ for tone repetition with leftover tones with respect to certain RU/MRU sizes. As shown in FIG. 6, there may be some leftover tones given a certain size of RU and a number of repetitions. For instance, for RU242 and $N_{sd}$=58, there may be four times (4×) of repetition with 10 leftover bits (=242−58*4); and for RU106 and $N_{sd}$=11, there may be nine times (9×) of repetition with 7 leftover bits (=106−11*9).

FIG. 7 illustrates an example design 700 under a proposed scheme in accordance with the present disclosure. Design 700 pertains to BCC interleaver parameters under the proposed scheme for tone repetition with $N_{ss}$≥2. The table in FIG. 7 shows the PHY parameters $N_{sd}$, $N_{col}$, $N_{row}$ and $N_{rot}$ for various numbers of tone repetition and different sizes of RU and MRU (listed in terms of number of tones).

FIG. 8 illustrates an example design 800 under a proposed scheme in accordance with the present disclosure. Design 800 pertains to LDPC tone mapper parameter $D_{tm}$ under the proposed scheme for ELR tone repetition with no leftover tones. The table in FIG. 8 shows the PHY parameter $D_{tm}$ for various numbers of tone repetition and different sizes of RU and MRU (listed in terms of number of tones).

FIG. 9 illustrates an example design 900 under a proposed scheme in accordance with the present disclosure. Design 900 pertains to LDPC tone mapper parameter $D_{tm}$ under the proposed scheme for ELR tone repetition with leftover tones. The table in FIG. 9 shows the PHY parameter $D_{tm}$ for various numbers of tone repetition and different sizes of RU and MRU (listed in terms of number of tones). Compared to design 800, design 900 additionally provides $D_{tm}$ values (in shaded boxes) for tone repetition with leftover tones with respect to certain RU/MRU sizes.

FIG. 10 illustrates an example design 1000 under a proposed scheme in accordance with the present disclosure. Design 1000 pertains to the number of leftover tones for tone repetition. The table in FIG. 10 shows the number of leftover tones for various numbers of tone repetition and different sizes of RU and MRU (listed in terms of number of tones).

FIG. 11 illustrates an example design 1100 under a proposed scheme in accordance with the present disclosure. Design 1100 pertains to $N_{sd,\ short}$ of tone repetition for pre-FEC and post-FEC padding. The table in FIG. 11 shows $N_{sd,\ short}$ for various numbers of tone repetition and different sizes of RU and MRU (listed in terms of number of tones) with a base coding rate=½. In the present disclosure, the parameter $N_{sd,\ short}$ denotes a smaller number of data subcarriers in a short symbol segment in that there are fewer data subcarriers (or data tones) in a given RU compared to that associated with $N_{sd}$. For example, for the condition of 26-tone RU with 2× repetition in FIG. 7 and FIG. 11, $N_{sd,\ short}$=4 in FIG. 11, which is smaller than $N_{sd}$=12 in FIG. 7. For another example, $N_{sd,\ short}$=4 for a 26-tone RU and $N_{sd,\ short}$=6 for a 52-tone RU, and so on. Moreover, the value of $N_{sd,\ short}$ may differ depending on the number of repetition (e.g., $N_{sd,\ short}$=4 for a 26-tone RU with 2× repetition and $N_{sd,\ short}$=2 for a 26-tone RU with 3× repetition), as shown in FIG. 11.

FIG. 12 illustrates an example design 1200 under a proposed scheme in accordance with the present disclosure. Design 1200 pertains to $N_{sd,\ short}$ of tone repetition for pre-FEC and post-FEC padding. The table in FIG. 12 shows $N_{sd,\ short}$ for various numbers of tone repetition and different sizes of RU and MRU (listed in terms of number of tones) with a base coding rate=¼. As shown in FIG. 12, the value of $N_{sd,\ short}$ may differ depending on the number of repetition (e.g., $N_{sd,\ short}$=8 for a 52-tone RU with 2× repetition and $N_{sd,\ short}$=4 for a 52-tone RU with 3× repetition).

FIG. 13 illustrates an example design 1300 under a proposed scheme in accordance with the present disclosure. Design 1300 pertains to tone repetition and effective coding rate. The table in FIG. 13 shows the effective coding rate (eR) for various numbers of tone repetition and different base coding rates (R) of ½, ⅓ and ¼.

FIG. 14 illustrates an example design 1400 under a proposed scheme in accordance with the present disclosure. Design 1400 pertains to data rate for tone repetition. The table in FIG. 14 shows the data rates under different effective coding rates (eR) for different sizes of RU and MRU (listed in terms of number of tones) with different GIs.

FIG. 15 illustrates an example design 1500 under a proposed scheme in accordance with the present disclosure. Design 1500 pertains to PHY parameters of number of bits per subcarrier per spatial stream ($N_{bpscs}$), $N_{sd}$, $N_{cbps}$ and $N_{dbps}$ for tone repetition. The tables in FIG. 15 show the PHY parameters of $N_{bpscs}$, $N_{sd}$, $N_{cbps}$ and $N_{dbps}$ under different numbers of tone repetition and effective coding rates for RU26 and RU52. In FIG. 15, "bR" denotes the base coding rate, and "eR" denotes the effective coding rate.

FIG. 16 illustrates an example design 1600 under a proposed scheme in accordance with the present disclosure. Design 1600 pertains to PHY parameters of $N_{bpscs}$, $N_{sd}$, $N_{cbps}$ and $N_{dbps}$ for tone repetition. The tables in FIG. 16 show the PHY parameters of $N_{bpscs}$, $N_{sd}$, $N_{cbps}$ and $N_{dbps}$ under different numbers of tone repetition and effective coding rates for RU106 and RU242. In FIG. 16, "bR" denotes the base coding rate, and "eR" denotes the effective coding rate.

Illustrative Implementations

Figure 17:
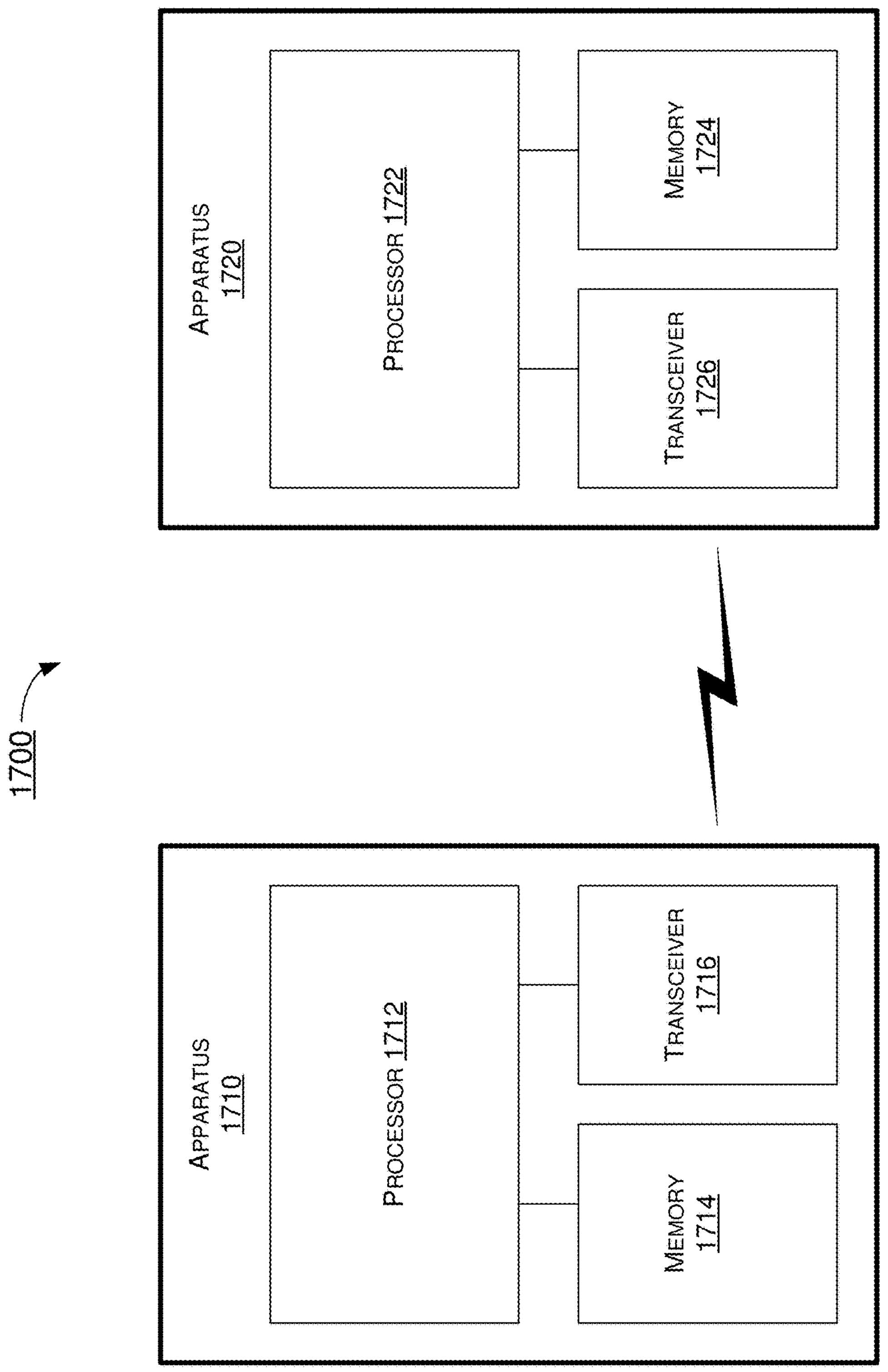
FIG. 17 is a block diagram of an example communication system in accordance with an implementation of the present disclosure.

FIG. 17 illustrates an example system 1700 having at least an example apparatus 1710 and an example apparatus 1720 in accordance with an implementation of the present disclosure. Each of apparatus 1710 and apparatus 1720 may perform various functions to implement schemes, techniques, processes and methods described herein pertaining to PHY parameter designs enabling RU duplication and tone repetition for next-generation WLANs, including the various schemes described above with respect to various proposed designs, concepts, schemes, systems and methods described above as well as processes described below. For instance, apparatus 1710 may be implemented in STA 110 and apparatus 1720 may be implemented in STA 120, or vice versa.

Each of apparatus 1710 and apparatus 1720 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 1710 and apparatus 1720 may be implemented in a smartphone, a smart watch, a personal digital assistant, a digital camera, or a computing equipment such as a tablet computer, a laptop computer or a notebook computer. Each of apparatus 1710 and apparatus 1720 may also be a part of a machine type apparatus, which may be an IoT apparatus such as an immobile or a stationary apparatus, a home apparatus, a wire communication apparatus or a computing apparatus. For instance, each of apparatus 1710 and apparatus 1720 may be implemented in a smart thermostat, a smart fridge, a smart door lock, a wireless speaker or a home control center. When implemented in or as a network apparatus, apparatus 1710 and/or apparatus 1720 may be implemented in a network node, such as an AP in a WLAN.

In some implementations, each of apparatus 1710 and apparatus 1720 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1710 and apparatus 1720 may be implemented in or as a STA or an AP. Each of apparatus 1710 and apparatus 1720 may include at least some of those components shown in FIG. 17 such as a processor 1712 and a processor 1722, respectively, for example. Each of apparatus 1710 and apparatus 1720 may further include one or more other components not pertinent to the proposed scheme of the present disclosure (e.g., internal power supply, display device and/or user interface device), and, thus, such component(s) of apparatus 1710 and apparatus 1720 are neither shown in FIG. 17 nor described below in the interest of simplicity and brevity.

In one aspect, each of processor 1712 and processor 1722 may be implemented in the form of one or more single-core processors, one or more multi-core processors, one or more RISC processors or one or more CISC processors. That is, even though a singular term "a processor" is used herein to refer to processor 1712 and processor 1722, each of processor 1712 and processor 1722 may include multiple processors in some implementations and a single processor in other implementations in accordance with the present disclosure. In another aspect, each of processor 1712 and processor 1722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1712 and processor 1722 is a special-purpose machine specifically designed, arranged and configured to perform specific tasks including those pertaining to PHY parameter designs enabling RU duplication and tone repetition for next-generation WLANs in accordance with various implementations of the present disclosure.

In some implementations, apparatus 1710 may also include a transceiver 1716 coupled to processor 1712. Transceiver 1716 may include a transmitter capable of wirelessly transmitting and a receiver capable of wirelessly receiving data. In some implementations, apparatus 1720 may also include a transceiver 1726 coupled to processor 1722. Transceiver 1726 may include a transmitter capable of wirelessly transmitting and a receiver capable of wirelessly receiving data. It is noteworthy that, although transceiver 1716 and transceiver 1726 are illustrated as being external to and separate from processor 1712 and processor 1722, respectively, in some implementations, transceiver 1716 may be an integral part of processor 1712 as a system on chip (SoC), and transceiver 1726 may be an integral part of processor 1722 as a SoC.

In some implementations, apparatus 1710 may further include a memory 1714 coupled to processor 1712 and capable of being accessed by processor 1712 and storing data therein. In some implementations, apparatus 1720 may further include a memory 1724 coupled to processor 1722 and capable of being accessed by processor 1722 and storing data therein. Each of memory 1714 and memory 1724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1714 and memory 1724 may include a type of read-only memory (ROM) such as mask ROM, programmable ROM (PROM), erasable programmable ROM (EPROM) and/or electrically erasable programmable ROM (EEPROM). Alternatively, or additionally, each of memory 1714 and memory 1724 may include a type of non-volatile random-access memory (NVRAM) such as flash memory, solid-state memory, ferroelectric RAM (FeRAM), magnetoresistive RAM (MRAM) and/or phase-change memory.

Each of apparatus 1710 and apparatus 1720 may be a communication entity capable of communicating with each other using various proposed schemes in accordance with the present disclosure. For illustrative purposes and without limitation, a description of capabilities of apparatus 1710, as STA 110, and apparatus 1720, as STA 120, is provided below in the context of example process 1800. It is noteworthy that, although a detailed description of capabilities, functionalities and/or technical features of apparatus 1720 is provided below, the same may be applied to apparatus 1710 although a detailed description thereof is not provided solely in the interest of brevity. It is also noteworthy that, although the example implementations described below are provided in the context of WLAN, the same may be implemented in other types of networks.

Illustrative Processes

Figure 18:
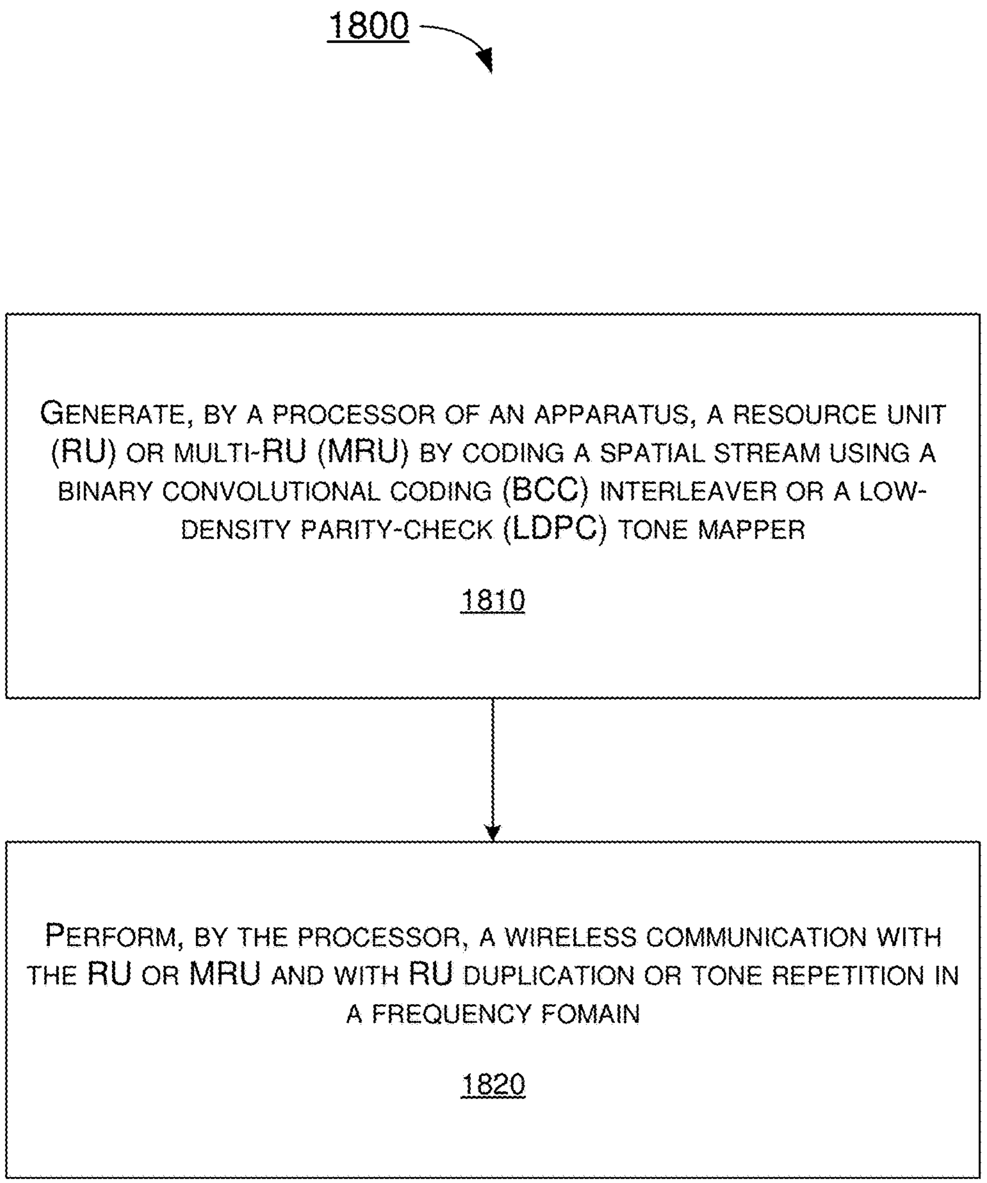
FIG. 18 is a flowchart of an example process in accordance with an implementation of the present disclosure.

FIG. 18 illustrates an example process 1800 in accordance with an implementation of the present disclosure. Process 1800 may represent an aspect of implementing various proposed designs, concepts, schemes, systems and methods described above. More specifically, process 1800 may represent an aspect of the proposed concepts and schemes pertaining to PHY parameter designs enabling RU duplication and tone repetition for next-generation WLANs in accordance with the present disclosure. Process 1800 may include one or more operations, actions, or functions as illustrated by one or more of blocks 1810 and 1820. Although illustrated as discrete blocks, various blocks of process 1800 may be divided into additional blocks, combined into fewer blocks, or eliminated, depending on the desired implementation. Moreover, the blocks/sub-blocks of process 1800 may be executed in the order shown in FIG. 18 or, alternatively in a different order. Furthermore, one or more of the blocks/sub-blocks of process 1800 may be executed repeatedly or iteratively. Process 1800 may be implemented by or in apparatus 1710 and apparatus 1720 as well as any variations thereof. Solely for illustrative purposes and without limiting the scope, process 1800 is described below in the context of apparatus 1710 implemented in or as STA 110 functioning as a non-AP STA and apparatus 1720 implemented in or as STA 120 functioning as an AP STA of a wireless network such as a WLAN in network environment 100 in accordance with one or more of IEEE 802.11 standards. Process 1800 may begin at block 1810.

At 1810, process 1800 may involve processor 1712 of apparatus 1710 generating a RU or MRU. For instance, in generating the RU or MRU, process 1800 may involve processor 1712 coding a spatial stream using a BCC interleaver or an LDPC tone mapper. Process 1800 may proceed from 1810 to 1820.

At 1820, process 1800 may involve processor 1712 performing, via transceiver 1716, a wireless communication with the RU or MRU. For instance, in performing the wireless communication, process 1800 may involve processor 1712 performing the wireless communication with RU duplication or tone repetition in a frequency domain.

In some implementations, in performing the wireless communication, process 1800 may involve processor 1712 performing the wireless communication with RU duplication in a frequency domain with a RU repetition of two times (2×), three times (3×), four times (4×), six times (6×), eight timers (8×), nine times (9×), twelve times (12×) or sixteen times (16×). Moreover, in coding the spatial stream, process 1800 may involve processor 1712 reusing an existing BCC interleaver or an existing LDPC tone mapper.

In some implementations, in generating the RU or MRU, process 1800 may involve processor 1712 generating a 242-tone RU (RU242) for a single spatial stream. In some implementations, in performing the wireless communication, process 1800 may involve processor 1712 performing the wireless communication with tone repetition in the frequency domain and with or without leftover tones. Moreover, in coding the spatial stream, process 1800 may involve processor 1712 coding the spatial stream using the BCC interleaver with parameters comprising a number of data subcarriers ($N_{sd}$), a number of columns (Nicol) and a number of rows ($N_{row}$) such that: (i) for a number of tone repetition=2: $N_{sd}$=117; $N_{col}$=13 or 39; and $N_{row}$=9 or 3; (ii) for a number of tone repetition=3: $N_{sd}$=78; $N_{col}$=13 or 26 or 39; and $N_{row}$=6 or 3 or 2; (iii) for a number of tone repetition=6: $N_{sd}$=39; $N_{col}$=13; and $N_{row}$=3. (iv) for a number of tone repetition=9: $N_{sd}$=26; $N_{col}$=13; and $N_{row}$=2.

In some implementations, in generating the RU or MRU, process 1800 may involve processor 1712 generating a 242-tone RU (RU242) for two or more spatial streams. Additionally, in performing the wireless communication, process 1800 may involve processor 1712 performing the wireless communication with tone repetition in the frequency domain. Moreover, in coding the spatial stream, process 1800 may involve processor 1712 coding the two or more spatial stream using the BCC interleaver with parameters comprising a number of data subcarriers ($N_{sd}$), a number of columns ($N_{col}$), a number of rows ($N_{row}$), a number of rotations ($N_{rot}$) and a number of bits per subcarrier per spatial stream ($N_{bpscs}$) such that: (i) for a number of tone repetition=2: $N_{sd}$=117; $N_{col}$=13 or 39; $N_{row}$=(9 or 3)×$N_{bpscs}$; and $N_{rot}$=58; (ii) for a number of tone repetition=3: $N_{sd}$=78; $N_{col}$=13 or 26 or 39; $N_{row}$=(6 or 3 or 2)×$N_{bpscs}$; and $N_{rot}$=29; (iii) for a number of tone repetition=4: $N_{sd}$=58; $N_{col}$=29; $N_{row}$=2×$N_{bpscs}$; and $N_{rot}$=11; (iv) for a number of tone repetition=6: $N_{sd}$=39; $N_{col}$=13; $N_{row}$=3×$N_{bpscs}$; and $N_{rot}$=11; (v) for a number of tone repetition=8: $N_{sd}$=29; $N_{col}$=29; $N_{row}$=1×$N_{bpscs}$; and $N_{rot}$=2; (vi) for a number of tone repetition=9: $N_{sd}$=26; $N_{col}$=13; $N_{row}$=2×$N_{bpscs}$; and $N_{rot}$=2; (vii) for a number of tone repetition=12: $N_{sd}$=19; $N_{col}$=19; $N_{row}$=1×$N_{bpscs}$; and $N_{rot}$=2.

In some implementations, in generating the RU or MRU, process 1800 may involve processor 1712 generating a 26-tone RU (RU26). Additionally, in performing the wireless communication, process 1800 may involve processor 1712 performing the wireless communication with tone repetition in the frequency domain and without leftover tones. Moreover, in coding the spatial stream, process 1800 may involve processor 1712 coding the spatial stream with the LDPC tone mapper with $D_{tm}$ such that: (i) for a number of tone repetition=2, $D_{tm}$=1 or 2; (ii) for a number of tone repetition=3, $D_{tm}$=1; (iii) for a number of tone repetition=4, $D_{tm}$=1; (iv) for a number of tone repetition=6, $D_{tm}$=1; (v) for a number of tone repetition=8, $D_{tm}$=1; and (vi) for a number of tone repetition=12, $D_{tm}$=1.

In some implementations, in generating the RU or MRU, process 1800 may involve processor 1712 generating a 52-tone RU (RU52). Additionally, in performing the wireless communication, process 1800 may involve processor 1712 performing the wireless communication with tone repetition in the frequency domain and without leftover tones. Moreover, in coding the spatial stream, process 1800 may involve processor 1712 coding the spatial stream with the LDPC tone mapper with $D_{tm}$ such that: (i) for a number of tone repetition=2, $D_{tm}$=1 or 2; (ii) for a number of tone repetition=3, $D_{tm}$=1; (iii) for a number of tone repetition=4, $D_{tm}$=1; (iv) for a number of tone repetition=6, $D_{tm}$=1; (v) for a number of tone repetition=8, $D_{tm}$=1; and (vi) for a number of tone repetition=12, $D_{tm}$=1.

In some implementations, in generating the RU or MRU, process 1800 may involve processor 1712 generating a 106-tone RU (RU106). Additionally, in performing the wireless communication, process 1800 may involve processor 1712 performing the wireless communication with tone repetition in the frequency domain and without leftover tones. Moreover, in coding the spatial stream, process 1800 may involve processor 1712 coding the spatial stream with the LDPC tone mapper with $D_{tm}$ such that: (i) for a number of tone repetition=2, $D_{tm}$=3; (ii) for a number of tone repetition=3, $D_{tm}$=2; and (iii) for a number of tone repetition=6, $D_{tm}$=1.

In some implementations, in generating the RU or MRU, process 1800 may involve processor 1712 generating a 242-tone RU (RU242). Additionally, in performing the wireless communication, process 1800 may involve processor 1712 performing the wireless communication with tone repetition in the frequency domain and without leftover tones. Moreover, in coding the spatial stream, process 1800 may involve processor 1712 coding the spatial stream with the LDPC tone mapper with $D_{tm}$ such that: (i) for a number of tone repetition=2, $D_{tm}$=9 or 3; (ii) for a number of tone repetition=3, $D_{tm}$=3 or 2 or 6; (iii) for a number of tone repetition=6, $D_{tm}$=3 or 1; and (iv) for a number of tone repetition=9, $D_{tm}$=1 or 2.

In some implementations, in generating the RU or MRU, process 1800 may involve processor 1712 generating a 26-tone RU (RU26). Additionally, in performing the wireless communication, process 1800 may involve processor 1712 performing the wireless communication with tone repetition in the frequency domain and with leftover tones. Moreover, in coding the spatial stream, process 1800 may involve processor 1712 coding the spatial stream with the LDPC tone mapper with $D_{tm}$ such that: (i) for a number of tone repetition=2, $D_{tm}$=1 or 2; (ii) for a number of tone repetition=3, $D_{tm}$=1; (iii) for a number of tone repetition=4, $D_{tm}$=1; (iv) for a number of tone repetition=6, $D_{tm}$=1; (v) for a number of tone repetition=8, $D_{tm}$=1; (vi) for a number of tone repetition=9, $D_{tm}$=1; and (vii) for a number of tone repetition=12, $D_{tm}$=1.

In some implementations, in generating the RU or MRU, process 1800 may involve processor 1712 generating a 52-tone RU (RU52). Additionally, in performing the wireless communication, process 1800 may involve processor 1712 performing the wireless communication with tone repetition in the frequency domain and with leftover tones. Moreover, in coding the spatial stream, process 1800 may involve processor 1712 coding the spatial stream with the LDPC tone mapper with $D_{tm}$ such that: (i) for a number of tone repetition=2, $D_{tm}$=1 or 2; (ii) for a number of tone repetition=3, $D_{tm}$=1; (iii) for a number of tone repetition=4, $D_{tm}$=1; (iv) for a number of tone repetition=6, $D_{tm}$=1; (v) for a number of tone repetition=8, $D_{tm}$=1; (vi) for a number of tone repetition=9, $D_{tm}$=1; and (vii) for a number of tone repetition=12, $D_{tm}$=1.

In some implementations, in generating the RU or MRU, process 1800 may involve processor 1712 generating a 106-tone RU (RU106). Additionally, in performing the wireless communication, process 1800 may involve processor 1712 performing the wireless communication with tone repetition in the frequency domain and with leftover tones. Moreover, in coding the spatial stream, process 1800 may involve processor 1712 coding the spatial stream with the LDPC tone mapper with $D_{tm}$ such that: (i) for a number of tone repetition=2, $D_{tm}$=3; (ii) for a number of tone repetition=3, $D_{tm}$=2; (iii) for a number of tone repetition=4, $D_{tm}$=5; (iv) for a number of tone repetition=6, $D_{tm}$=1; (v) for a number of tone repetition=8, $D_{tm}$=1 or 2 or 3; (vi) for a number of tone repetition=9, $D_{tm}$=1; and (vii) for a number of tone repetition=12, $D_{tm}$=1.

In some implementations, in generating the RU or MRU, process 1800 may involve processor 1712 generating a 242-tone RU (RU242). Additionally, in performing the wireless communication, process 1800 may involve processor 1712 performing the wireless communication with tone repetition in the frequency domain and with leftover tones. Moreover, in coding the spatial stream, process 1800 may involve processor 1712 coding the spatial stream with the LDPC tone mapper with $D_{tm}$ such that: (i) for a number of tone repetition=2, $D_{tm}$=9 or 3; (ii) for a number of tone repetition=3, $D_{tm}$=3 or 2 or 6; (iii) for a number of tone repetition=4, $D_{tm}$=2; (iv) for a number of tone repetition=6, $D_{tm}$=3 or 1; (v) for a number of tone repetition=8, $D_{tm}$=1; (vi) for a number of tone repetition=9, $D_{tm}$=1 or 2; and (vii) for a number of tone repetition=12, $D_{tm}$=1.

In some implementations, in generating the RU or MRU, process 1800 may involve processor 1712 generating a 52-tone RU (RU52). Additionally, in performing the wireless communication, process 1800 may involve processor 1712 performing the wireless communication with tone repetition in the frequency domain. Moreover, in coding the spatial stream, process 1800 may involve processor 1712 coding the spatial stream with a base coding rate=½ and $N_{sd,\ short}$ for pre-FEC padding and post-FEC padding such that: (i) for two times (2×) of repetition, $N_{sd,\ short}$=4; (ii) for three times (3×) of repetition, $N_{sd,\ short}$=2; (iii) for four times (4×) of repetition, $N_{sd,\ short}$=2; (iv) for six times (6×) of repetition, $N_{sd,\ short}$=2; (v) for eight times (8×) of repetition, $N_{sd,\ short}$=2; (vi) for nine times (9×) of repetition, $N_{sd,\ short}$=2; and (vii) for twelve times (12×) of repetition, $N_{sd,\ short}$=2.

In some implementations, in generating the RU or MRU, process 1800 may involve processor 1712 generating a 242-tone RU (RU242). Additionally, in performing the wireless communication, process 1800 may involve processor 1712 performing the wireless communication with tone repetition in the frequency domain. Moreover, in coding the spatial stream, process 1800 may involve processor 1712 coding the spatial stream with a base coding rate=½ and $N_{sd,\ short}$ for pre-FEC padding and post-FEC padding such that: (i) for two times (2×) of repetition, $N_{sd,\ short}$=30; (ii) for three times (3×) of repetition, $N_{sd,\ short}$=20; (iii) for four times (4×) of repetition, $N_{sd,\ short}$=14; (iv) for six times (6×) of repetition, $N_{sd,\ short}$=10; (v) for eight times (8×) of repetition, $N_{sd,\ short}$=8; (vi) for nine times (9×) of repetition, $N_{sd,\ short}$=6; and (vii) for twelve times (12×) of repetition, $N_{sd,\ short}$=2.

In some implementations, in generating the RU or MRU, process 1800 may involve processor 1712 generating a 242-tone RU (RU242). Additionally, in performing the wireless communication, process 1800 may involve processor 1712 performing the wireless communication with tone repetition in the frequency domain. Moreover, in coding the spatial stream, process 1800 may involve processor 1712 coding the spatial stream with a base coding rate=½ and parameters comprising an effective coding rate (eR), $N_{bpscs}$, $N_{sd}$, $N_{cbps}$ and $N_{dbps}$ such that: (i) for a number of tone repetition=2: eR=¼; $N_{bpscs}$=1; $N_{sd}$=117; $N_{cbps}$=234; and $N_{dbps}$=58; (ii) for a number of tone repetition=3: eR=⅙; $N_{bpscs}$=1; $N_{sd}$=78; $N_{cbps}$=234; and $N_{dbps}$=39; (iii) for a number of tone repetition=4: eR=⅛; $N_{bpscs}$=1; $N_{sd}$=58; $N_{cbps}$=234; and $N_{dbps}$=29; (iv) fora number of tone repetition=6: eR=1/12; $N_{bpscs}$=1; $N_{sd}$=39; $N_{cbps}$=234; and $N_{dbps}$=19; (v) for a number of tone repetition=8: eR=1/16; $N_{bpscs}$=1; $N_{sd}$=29; $N_{cbps}$=234; and $N_{dbps}$=14; (vi) for a number of tone repetition=9: eR=1/18; $N_{bpscs}$=1; $N_{sd}$=26; $N_{cbps}$=234; and $N_{dbps}$=13; (vii) for a number of tone repetition=12: eR=1/24; $N_{bpscs}$=1; $N_{sd}$=19; $N_{cbps}$=234; and $N_{dbps}$=9; (viii) for a number of tone repetition=16: eR=1/32; $N_{bpscs}$=1; $N_{sd}$=14; $N_{cbps}$=234; and $N_{cbps}$=7.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

generating, by a processor of an apparatus, a resource unit (RU) or multi-RU (MRU); and performing, by the processor, a wireless communication with the RU or MRU, wherein the generating of the RU or MRU comprises coding a spatial stream using a binary convolutional coding (BCC) interleaver or a low-density parity-check (LDPC) tone mapper, wherein the performing of the wireless communication comprises performing the wireless communication with RU duplication or tone repetition in a frequency domain, wherein the generating of the RU or MRU comprises generating a 26-tone RU (RU26), 52-tone RU (RU52), 106-tone RU (RU106) or 242-tone RU (RU242) for one or more spatial streams, wherein the performing of the wireless communication comprises performing the wireless communication with tone repetition in the frequency domain and with or without leftover tones, and wherein, responsive to generating the RU242 for a single spatial stream and the coding of the spatial stream involving coding the spatial stream using the BCC interleaver with parameters comprising a number of data subcarriers ($N_{sd}$), a number of columns ($N_{col}$) and a number of rows ($N_{row}$):

for a number of tone repetition=2:

$N_{sd}$=117;

$N_{col}$=13 or 39; and $N_{row}$=9 or 3, for a number of tone repetition=3:

$N_{sd}$=78;

$N_{col}$=13 or 26 or 39; and $N_{row}$=6 or 3 or 2, for a number of tone repetition=6:

$N_{sd}$=39;

$N_{col}$=13; and $N_{row}$=3, and for a number of tone repetition=9:

$N_{sd}$=26;

$N_{col}$=13; and $N_{row}$=2.

2. The method of claim 1, wherein, responsive to generating the RU242 for two or more spatial streams, performing the wireless communication with tone repetition in the frequency domain, and the coding of the spatial stream involving coding the two or more spatial stream using the BCC interleaver with parameters comprising a number of data subcarriers ($N_{sd}$), a number of columns ($N_{col}$), a number of rows ($N_{row}$), a number of rotations ($N_{rot}$) and a number of bits per subcarrier per spatial stream ($N_{bpscs}$):

for a number of tone repetition=2:

$N_{sd}$=117;

$N_{col}$=13 or 39;

$N_{row}$=(9 or 3)×$N_{bpscs}$; and $N_{rot}$=58;

for a number of tone repetition=3:

$N_{sd}$=78;

$N_{col}$=13 or 26 or 39;

$N_{row}$=(6 or 3 or 2)×$N_{bpscs}$; and $N_{rot}$=29;

for a number of tone repetition=4:

$N_{sd}$=58;

$N_{col}$=29;

$N_{row}$=2×$N_{bpscs}$; and $N_{rot}$=11;

for a number of tone repetition=6:

$N_{sd}$=39;

$N_{col}$=13;

$N_{row}$=3×$N_{bpscs}$; and $N_{rot}$=11;

for a number of tone repetition=8:

$N_{sd}$=29;

$N_{col}$=29;

$N_{row}$=1×$N_{bpscs}$; and $N_{rot}$=2;

for a number of tone repetition=9:

$N_{sd}$=26;

$N_{col}$=13;

$N_{row}$=2×$N_{bpscs}$; and $N_{rot}$=2;

for a number of tone repetition=12:

$N_{sd}$=19;

$N_{col}$=19;

$N_{row}$=1×$N_{bpscs}$; and $N_{rot}$=2.

3. The method of claim 1, wherein, responsive to generating the RU26, performing the wireless communication with tone repetition in the frequency domain and without leftover tones, and the coding of the spatial stream involving coding the spatial stream with the LDPC tone mapper with a parameter of a tone mapping distance ($D_{tm}$):

for a number of tone repetition=2, $D_{tm}$=1 or 2;

for a number of tone repetition=3, $D_{tm}$=1;

for a number of tone repetition=4, $D_{tm}$=1;

for a number of tone repetition=6, $D_{tm}$=1;

for a number of tone repetition=8, $D_{tm}$=1; and for a number of tone repetition=12, $D_{tm}$=1.

4. The method of claim 1, wherein, responsive to generating the RU52, performing the wireless communication with tone repetition in the frequency domain and without leftover tones, and the coding of the spatial stream involving coding the spatial stream with the LDPC tone mapper with a parameter of a tone mapping distance ($D_{tm}$):

for a number of tone repetition=2, $D_{tm}$=1 or 2;

for a number of tone repetition=3, $D_{tm}$=1;

for a number of tone repetition=4, $D_{tm}$=1;

for a number of tone repetition=6, $D_{tm}$=1;

for a number of tone repetition=8, $D_{tm}$=1; and for a number of tone repetition=12, $D_{tm}$=1.

5. The method of claim 1, wherein, responsive to generating the RU106, performing the wireless communication with tone repetition in the frequency domain and without leftover tones, and the coding of the spatial stream involving coding the spatial stream with the LDPC tone mapper with a parameter of a tone mapping distance ($D_{tm}$):

for a number of tone repetition=2, $D_{tm}$=3;

for a number of tone repetition=3, $D_{tm}$=2; and for a number of tone repetition=6, $D_{tm}$=1.

6. The method of claim 1, wherein, responsive to generating the RU242, performing the wireless communication with tone repetition in the frequency domain and without leftover tones, and the coding of the spatial stream involving coding the spatial stream with the LDPC tone mapper with a parameter of a tone mapping distance ($D_{tm}$):

for a number of tone repetition=2, $D_{tm}$=9 or 3;

for a number of tone repetition=3, $D_{tm}$=3 or 2 or 6;

for a number of tone repetition=6, $D_{tm}$=3 or 1; and for a number of tone repetition=9, $D_{tm}$=1 or 2.

7. The method of claim 1, wherein, responsive to generating the RU26, performing the wireless communication with tone repetition in the frequency domain and with leftover tones, and the coding of the spatial stream involving coding the spatial stream with the LDPC tone mapper with a parameter of a tone mapping distance ($D_{tm}$):

for a number of tone repetition=2, $D_{tm}$=1 or 2;

for a number of tone repetition=3, $D_{tm}$=1;

for a number of tone repetition=4, $D_{tm}$=1;

for a number of tone repetition=6, $D_{tm}$=1;

for a number of tone repetition=8, $D_{tm}$=1;

for a number of tone repetition=9, $D_{tm}$=1; and for a number of tone repetition=12, $D_{tm}$=1.

8. The method of claim 1, wherein, responsive to generating the RU52, performing the wireless communication with tone repetition in the frequency domain and with leftover tones, and the coding of the spatial stream involving coding the spatial stream with the LDPC tone mapper with a parameter of a tone mapping distance ($D_{tm}$):

for a number of tone repetition=2, $D_{tm}$=1 or 2;

for a number of tone repetition=3, $D_{tm}$=1;

for a number of tone repetition=4, $D_{tm}$=1;

for a number of tone repetition=6, $D_{tm}$=1;

for a number of tone repetition=8, $D_{tm}$=1;

for a number of tone repetition=9, $D_{tm}$=1; and
for a number of tone repetition=12, $D_{tm}$=1.

9. The method of claim 1, wherein, responsive to generating the RU106, performing the wireless communication with tone repetition in the frequency domain and with leftover tones, and the coding of the spatial stream comprises-involving coding the spatial stream with the LDPC tone mapper with a parameter of a tone mapping distance ($D_{tm}$):

for a number of tone repetition=2, $D_{tm}$=3;
for a number of tone repetition=3, $D_{tm}$=2;
for a number of tone repetition=4, $D_{tm}$=5;
for a number of tone repetition=6, $D_{tm}$=1;
for a number of tone repetition=8, $D_{tm}$=1 or 2 or 3;
for a number of tone repetition=9, $D_{tm}$=1; and
for a number of tone repetition=12, $D_{tm}$=1.

10. The method of claim 1, wherein, responsive to generating the RU242, performing the wireless communication with tone repetition in the frequency domain and with leftover tones, and the coding of the spatial stream involving coding the spatial stream with the LDPC tone mapper with a parameter of a tone mapping distance ($D_{tm}$):

for a number of tone repetition=2, $D_{tm}$=9 or 3;
for a number of tone repetition=3, $D_{tm}$=3 or 2 or 6;
for a number of tone repetition=4, $D_{tm}$=2;
for a number of tone repetition=6, $D_{tm}$=3 or 1;
for a number of tone repetition=8, $D_{tm}$=1;
for a number of tone repetition=9, $D_{tm}$=1 or 2; and
for a number of tone repetition=12, $D_{tm}$=1.

11. The method of claim 1, wherein, responsive to generating the RU52, performing the wireless communication with tone repetition in the frequency domain, and the coding of the spatial stream involving coding the spatial stream with a base coding rate=½ and a parameter of a short number of data subcarriers ($N_{sd,\ short}$) for pre-forward error correction (pre-FEC) padding and post-FEC padding-such that:

for two times (2×) of repetition, $N_{sd,\ short}$=4;
for three times (3×) of repetition, $N_{sd,\ short}$=2;
for four times (4×) of repetition, $N_{sd,\ short}$=2;
for six times (6×) of repetition, $N_{sd,\ short}$=2;
for eight times (8×) of repetition, $N_{sd,\ short}$=2;
for nine times (9×) of repetition, $N_{sd,\ short}$=2; and
for twelve times (12×) of repetition, $N_{sd,\ short}$=2.

12. The method of claim 1, wherein, responsive to generating the RU242, performing the wireless communication with tone repetition in the frequency domain, and the coding of the spatial stream involving coding the spatial stream with a base coding rate=½ and a parameter of a short number of data subcarriers ($N_{sd,\ short}$) for pre-forward error correction (pre-FEC) padding and post-FEC padding:

for two times (2×) of repetition, $N_{sd,\ short}$=30;
for three times (3×) of repetition, $N_{sd,\ short}$=20;
for four times (4×) of repetition, $N_{sd,\ short}$=14;
for six times (6×) of repetition, $N_{sd,\ short}$=10;
for eight times (8×) of repetition, $N_{sd,\ short}$=8;
for nine times (9×) of repetition, $N_{sd,\ short}$=6; and
for twelve times (12×) of repetition, $N_{sd,\ short}$=2.

13. The method of claim 1, wherein, responsive to generating the RU242, performing the wireless communication with tone repetition in the frequency domain, and the coding of the spatial stream involving coding the spatial stream with a base coding rate=½ and parameters comprising an effective coding rate (eR), a number of bits per subcarrier per spatial stream ($N_{bpscs}$), a number of data subcarriers ($N_{sd}$), a number of coded bits per symbol ($N_{cbps}$) and a number of data bits per symbol ($N_{dbps}$):

for a number of tone repetition=2:
eR=¼;
$N_{bpscs}$=1;
$N_{sd}$=117;
$N_{cbps}$=234; and
$N_{dbps}$=58;

for a number of tone repetition=3:
eR=⅙;
$N_{bpscs}$=1;
$N_{sd}$=78;
$N_{cbps}$=234; and
$N_{dbps}$=39;

for a number of tone repetition=4:
eR=⅛;
$N_{bpscs}$=1;
$N_{sd}$=58;
$N_{cbps}$=234; and
$N_{dbps}$=29;

for a number of tone repetition=6:
eR=1/12;
$N_{bpscs}$=1;
$N_{sd}$=39;
$N_{cbps}$=234; and
$N_{dbps}$=19;

for a number of tone repetition=8:
eR=1/16;
$N_{bpscs}$=1;
$N_{sd}$=29;
$N_{cbps}$=234; and
$N_{dbps}$=14;

for a number of tone repetition=9:
eR=1/18;
$N_{bpscs}$=1;
$N_{sd}$=26;
$N_{cbps}$=234; and
$N_{dbps}$=13;

for a number of tone repetition=12:
eR=1/24;
$N_{bpscs}$=1;
$N_{sd}$=19;
$N_{cbps}$=234; and
$N_{dbps}$=9;

for a number of tone repetition=16:
eR=1/32;
$N_{bpscs}$=1;
$N_{sd}$=14;
$N_{cbps}$=234; and
$N_{dbps}$=7.

14. An apparatus, comprising:

a transceiver configured to communicate wirelessly; and a processor coupled to the transceiver and configured to perform operations comprising:

generating a resource unit (RU) or multi-RU (MRU); and performing, via the transceiver, a wireless communication with the RU or MRU, wherein the generating of the RU or MRU comprises coding a spatial stream using a binary convolutional coding (BCC) interleaver or a low-density parity-check (LDPC) tone mapper, wherein the performing of the wireless communication comprises performing the wireless communication with RU duplication or tone repetition in a frequency domain, wherein the generating of the RU or MRU comprises generating a 26-tone RU (RU26), 52-tone RU (RU52), 106-tone RU (RU106) or 242-tone RU (RU242) for one or more spatial streams, wherein the performing of the wireless communication comprises performing the wireless communication with tone repetition in the frequency domain and with or without leftover tones, and wherein, responsive to generating the RU242 for a single spatial stream and the coding of the spatial stream involving coding the spatial stream using the BCC interleaver with parameters comprising a number of data subcarriers ($N_{sd}$), a number of columns ($N_{col}$) and a number of rows ($N_{row}$):

for a number of tone repetition=2:

$N_{sd}$=117;

$N_{col}$=13 or 39; and $N_{row}$=9 or 3, for a number of tone repetition=3:

$N_{sd}$=78;

$N_{col}$=13 or 26 or 39; and $N_{row}$=6 or 3 or 2, for a number of tone repetition=6:

$N_{sd}$=39;

$N_{col}$=13; and $N_{row}$=3, and for a number of tone repetition=9:

$N_{sd}$=26;

$N_{col}$=13; and $N_{row}$=2.

* * * * *